(12) United States Patent
Baudasse et al.

(10) Patent No.: US 7,850,124 B2
(45) Date of Patent: Dec. 14, 2010

(54) LONG-SERVICE-LIFE ROTARY POSITIONING DEVICE FOR SPACE APPLICATIONS

(75) Inventors: Yannick Baudasse, Grasse (FR); Jerome Brossier, Cannes la Bocca (FR)

(73) Assignee: Thales (FR)

( * ) Notice: Subject to any disclaimer, the term of this patent is extended or adjusted under 35 U.S.C. 154(b) by 807 days.

(21) Appl. No.: 11/769,283

(22) Filed: Jun. 27, 2007

(65) Prior Publication Data
US 2008/0001021 A1 Jan. 3, 2008

(30) Foreign Application Priority Data
Jun. 27, 2006 (FR) .................... 06 52667

(51) Int. Cl.
*B64G 1/22* (2006.01)
(52) U.S. Cl. ..................... 244/172.6; 244/158.1; 74/470
(58) Field of Classification Search .............. 244/172.6, 244/158.1; 74/470, 491, 504, 519
See application file for complete search history.

(56) References Cited
U.S. PATENT DOCUMENTS

| 3,587,999 | A | | 6/1971 | Miniovitch et al. | |
|---|---|---|---|---|---|
| 4,373,690 | A | * | 2/1983 | Stillman et al. | .......... 244/172.6 |
| 4,884,464 | A | * | 12/1989 | Grattarola et al. | .............. 74/50 |
| 5,673,459 | A | * | 10/1997 | Baghdasarian | ................ 16/308 |
| 6,956,696 | B2 | * | 10/2005 | Hachkowski et al. | ........ 359/399 |
| 2003/0192994 | A1 | | 10/2003 | Holemans | |

FOREIGN PATENT DOCUMENTS

| EP | 0481857 | 4/1992 |
|---|---|---|
| EP | 0738656 | 10/1996 |
| FR | 2703415 | 10/1994 |

* cited by examiner

*Primary Examiner*—Christopher P Ellis
(74) *Attorney, Agent, or Firm*—Lowe Hauptman Ham & Berner, LLP

(57) ABSTRACT

A rotary positioning device of a movable element for space equipment comprising a part attached to a fixed portion of the equipment and a handle actuating the movable portion of the equipment, said handle being rigidly connected to a first race of a ball or roller antifriction bearing and said fixed part being connected to the second race of said antifriction bearing, wherein a link between said fixed part and the second race is an elastic link in rotation about the axis of said antifriction bearing and wherein a stop is rigidly attached to one of the races in order to interact with an element rigidly attached to the other race, so that the relative rotation of the two races of said antifriction bearing is limited angularly.

9 Claims, 4 Drawing Sheets

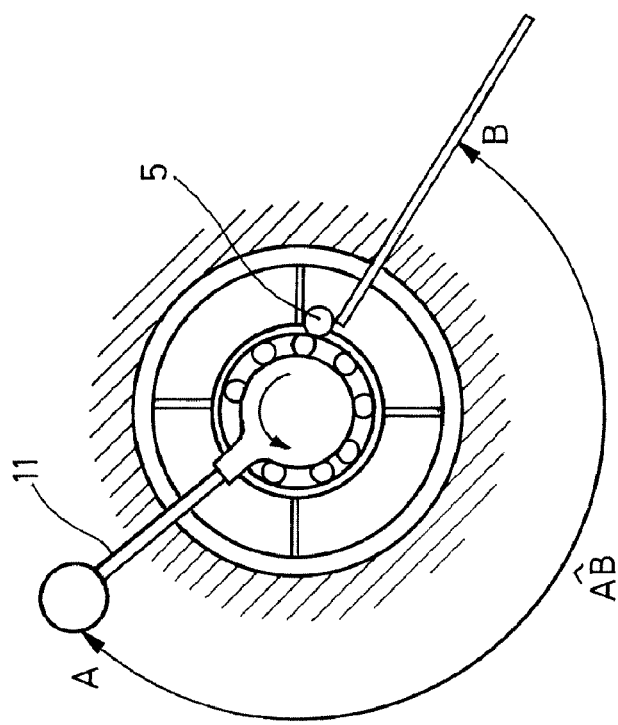
FIG_1
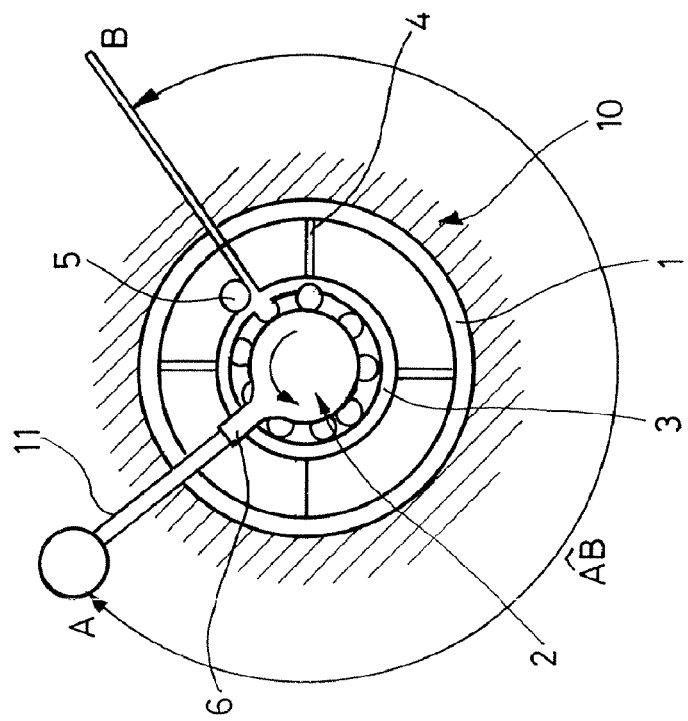
FIG_2

FIG_3
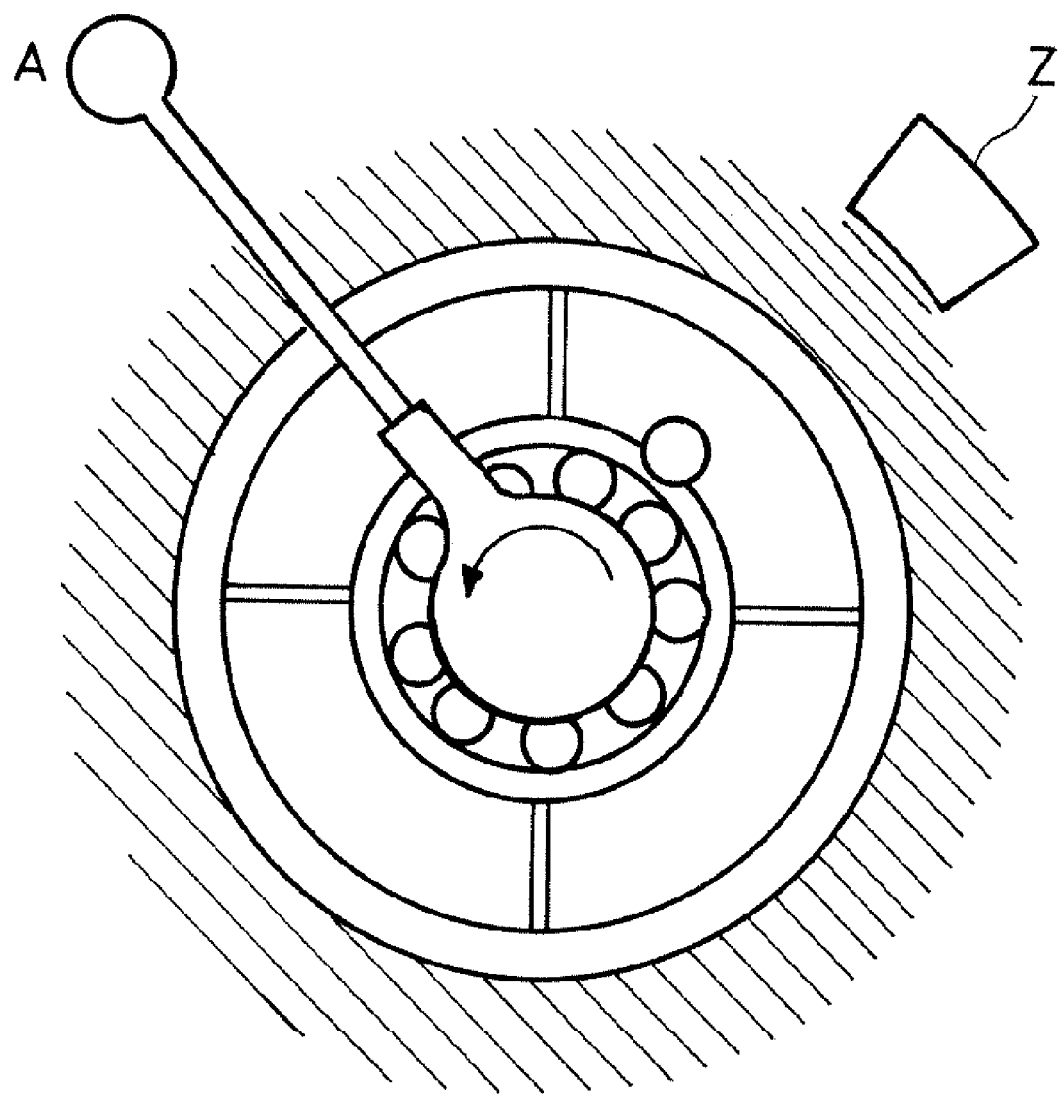

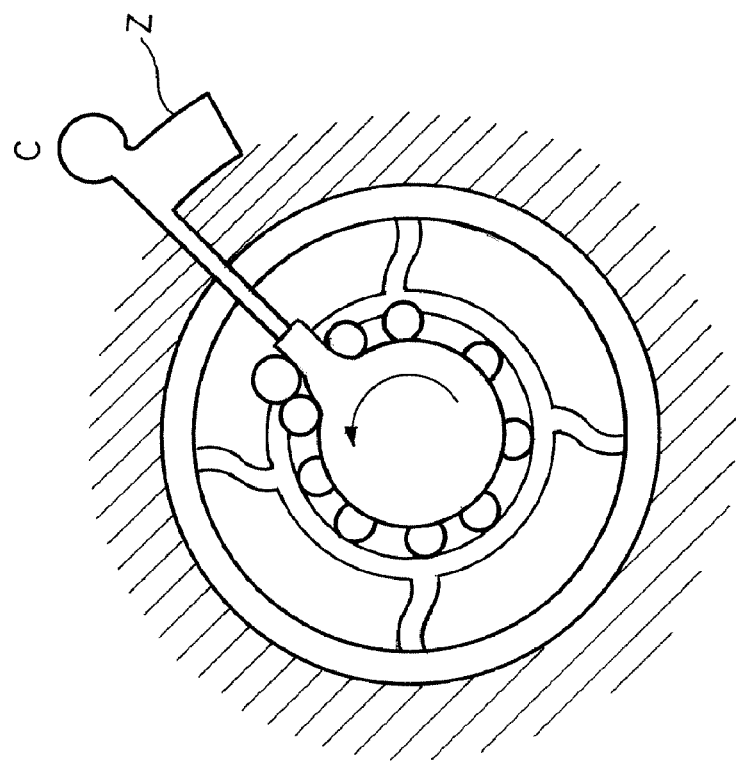
FIG_5
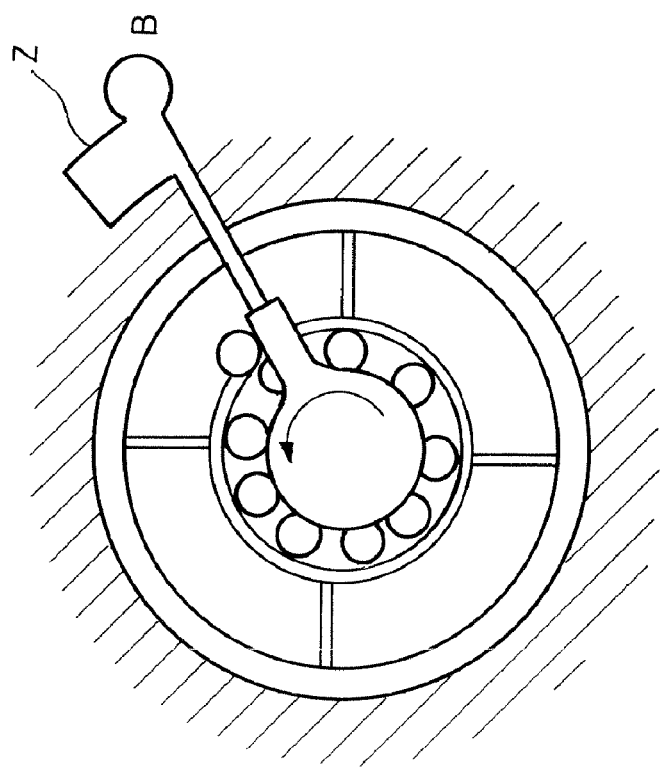
FIG_4

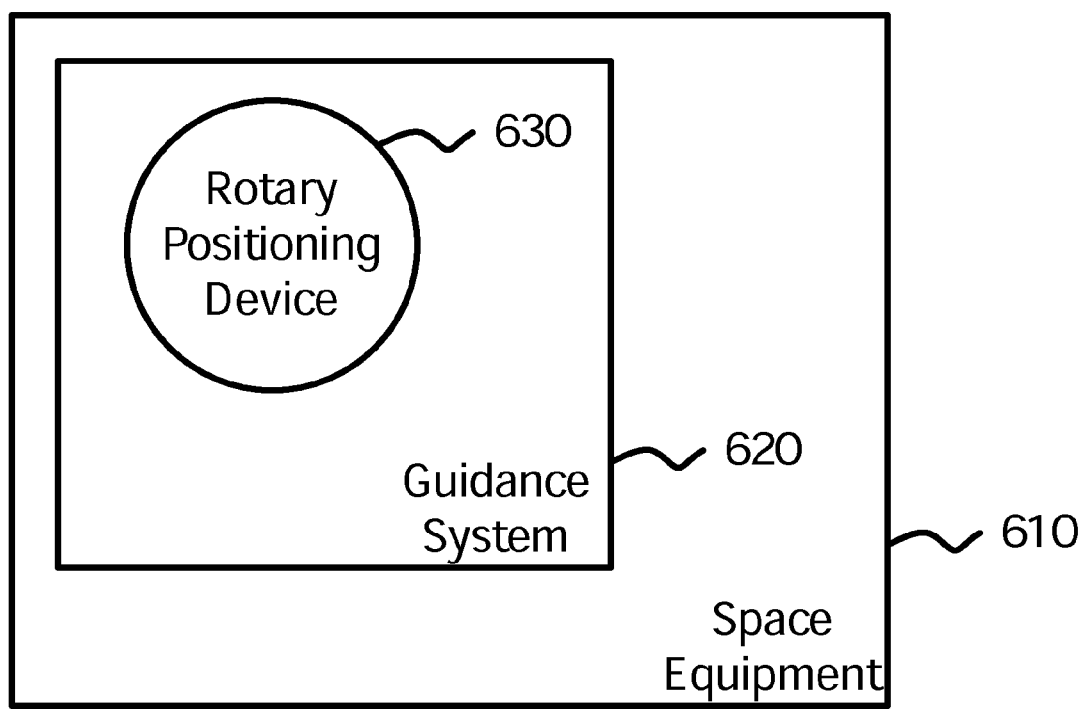
FIG_6

LONG-SERVICE-LIFE ROTARY POSITIONING DEVICE FOR SPACE APPLICATIONS

RELATED APPLICATIONS

The present application is based on, and claims priority from, French Application Number 0652667, filed Jun. 27, 2006, the disclosure of which is hereby incorporated by reference herein in its entirety.

FIELD OF THE INVENTION

The field of the present invention is that of guidance components for the equipment used in space applications, such as for example the manufacture of satellites, and in particular that of rotary error sensors for space appendages.

BACKGROUND OF THE INVENTION

In space applications, it is necessary to be able to orient certain elements of a satellite or of a space vehicle, such as an antenna, a mast, etc. in a predetermined direction in order, for example, to direct them toward a fixed star, to maintain a heading toward a point on the surface of the earth, or else to scan a particular zone on the surface of the earth or of a star. These positionings must be frequently corrected to compensate for inevitable drifts in maintaining this direction and these multiple corrections cause the implementation of a large number of microrotation cycles for these space appendages and for their guidance devices.

Because of the irreversible character of placing a satellite in orbit, it is necessary, during the design of a spacecraft, to allow for a very long service life, measured in number of cycles, for these items of equipment, in order to ensure that they are able to withstand these highly numerous stresses.

This phase, called fine error sensing, usually follows a deployment phase, during which the space appendages are taken out of the packaging that has been defined for the launch and are placed in position to perform their function. Even if, in some cases, it may be necessary to use multiple deployments, the latter are still very limited in number (at most a few tens, even a hundred or so) and do not require the error sensing devices to be designed to such demanding standards as for fine error sensing movements.

Since these items of equipment must operate in the space vacuum, users come up against a particular problem associated with the difficulty of ensuring good lubrication of the portions in contact during these rotations.

The lubrication of the parts making linear movements is correctly resolved by the installation of fixed metal seals and bellows enclosing the range of movement of the parts, which makes it possible to operate in a lubricated environment (by oil bath in a closed enclosure) and to allow large numbers of linear movement cycles.

This configuration cannot be reproduced for rotary movements, the seal between the guidance device and the shaft that it drives being able to be achieved only by seals and hence by friction between the rotating parts. The resultant service life for such systems is thereby greatly degraded.

Former realizations have therefore been obliged to choose, for these rotary movements, between systems based on antifriction bearings, shaft bearings, ball-and-socket joints, or roller tracks, etc. capable of ensuring angular movements of large amplitude, and systems based on flexible components, with no contact between the rotating parts, but that allow only limited angular movements.

Because of imperfect lubrication, the first are sensitive to the phenomena of seizing by molecular cohesion of the facing materials and do not have a long service life. The phenomenon is further accentuated when it is desired to make them make micromovements, because of phenomena of migration or evaporation of the lubricants. The second do not need lubrication and therefore have a service life compatible with the intended use but they are limited in their field of use by their small angular movement.

SUMMARY OF THE INVENTION

The object of the present invention is to remedy these disadvantages by proposing a rotary positioning device capable, with one and the same motor drive, of angular movements of large amplitude with a relatively short service life for a phase called deployment and of movements of small amplitude with a very long service life for a phase called fine error sensing.

Accordingly, the subject of the invention is a rotary positioning device of a movable element for space equipment comprising a part attached to the fixed portion of said equipment and a handle actuating the movable portion of said equipment, said handle being rigidly connected to a first race of a ball or roller antifriction bearing and said fixed part being connected to the second race of said antifriction bearing, wherein the link between said fixed part and the second race is an elastic link in rotation about the axis of said antifriction bearing and wherein a stop is rigidly attached to one of the races in order to interact with an element rigidly attached to the other race, so that the relative rotation of the two races of said antifriction bearing is limited angularly.

Such a device makes it possible to make large amplitude movements by means of the antifriction bearing while in the deployment phase and then stop the rotation of the antifriction bearing when the fine error sensing zone is reached.

Preferably, the angular positioning of the stop on its supporting race is adjustable.

This makes it possible to choose the direction from which the fine error sensing will be carried out.

Advantageously, the elastic link is at rest when the element designed to interact with the stop is not in contact with said stop.

In this configuration, the two rotational means are independent and do not interfere in the positioning of the movable portion of the equipment.

In a preferred embodiment, the fixed part has a substantially circular ring shape coaxial with said antifriction bearing.

Preferably, the elastic link is provided by arms made of flexible material placed radially between the fixed part and the second race.

Advantageously, said handle is attached to the hub of the inner race of said antifriction bearing.

According to a preferred embodiment, the handle is indistinguishable from the element designed to interact with the stop.

BRIEF DESCRIPTION OF THE DRAWINGS

The invention will be better understood and other subjects, details, features and advantages of the latter will appear more clearly during the detailed explanatory description that follows of an embodiment of the invention given as a purely illustrative and nonlimiting example, with reference to the appended schematic drawings.

In these drawings:

FIG. 1 is a view in section of a rotary positioning device according to one embodiment of the invention, the angular stop being in a first position;

FIG. 2 is the same view in section of the rotary positioning device, the angular stop being in a second position;

FIG. 3 is the same view in section of the rotary positioning device, in operation at the beginning of the deployment phase;

FIG. 4 is the same view in section of the rotary positioning device, in operation at the end of the deployment phase and at the beginning of the fine error sensing phase;

FIG. 5 is the same view in section of the rotary positioning device, in operation during the fine error sensing phase.

FIG. 6 is a system block diagram of a space equipment according to some embodiments of the present application.

DETAILED DESCRIPTION OF THE INVENTION

With reference to FIG. 1, a rotary positioning device according to the invention is shown comprising a circular ring 1 connected to a fixed portion 10 of the equipment of the satellite concerned. This ring 1 is connected via flexible arms 4 to a second circular ring 3 coaxial with the first, forming an outer race of an antifriction bearing of the ball or roller type. The inner race of said antifriction bearing is mounted on a hub 2 to which is attached, via a connecting handle 6, a part 11 of rotary drive of the movable portion of the equipment of the satellite concerned.

To the outer race of the antifriction bearing is attached a stop 5 on which the handle 6 stops, in order to prevent the hub 2 from rotating beyond this stop position.

With reference to FIGS. 1 and 2, two different angular positions of the stop 5 are shown on the outer race 3 of the antifriction bearing and subsequently two different angles A^B of angular range of movement of said handle 6, between a position A when the part 11 is at the beginning of deployment and a position B when it is at the end of deployment.

With reference to FIGS. 3 to 5, the handle 6 and the part 11 are seen in positions A, B and C corresponding respectively to the start of deployment, end of deployment and maximum range of movement positions in the error sensing zone. The zone Z indicates the range of movement that the handle 6 is allowed to make by the flexibility of the arms 4 when said handle 6 is in contact with the stop 5, that is to say when the device is in a fine error sensing situation.

FIG. 6 is a system block diagram of a space equipment 610 according to some embodiments of the present application. The space equipment 610 comprises at least one guidance system 620. The guidance system 620 comprises a rotary positioning device 630. Although the rotary positioning device 630 is positioned as part of the guidance system 620, in some embodiments, the rotary positioning device 630 is usable for other space applications.

The operation of the invention will now be described during a phase of deployment of the satellite equipment concerned followed by a fine error sensing phase.

At the beginning, the satellite equipment concerned is in a standby position represented by the part 11 in the position A. This part must be brought into the zone Z, lying between the positions B and C, so that the satellite equipment concerned can perform its function of error sensing in a determined direction or of scanning a terrestrial zone. The extent of the zone Z is defined by those skilled in the art, when the rotary positioning device is designed, so as to obtain a sufficient amplitude to cover the future fluctuations in the heading that it is intended to follow, while taking account of the elastic deformation capabilities of the material of the flexible arms 4.

In use, prior to any deployment, the zone Z is positioned, by the operator before the launch or in orbit by any automatic or remote control system provided for this purpose, by placing the stop 5 facing the direction or the zone to be covered.

The movable portion of the equipment concerned is first of all set in rotation, via a conventional drive means not shown in the figures, by actuating the ball or roller antifriction bearing of the rotary positioning device.

At the end of deployment, that is to say when the rotation of this movable portion has reached the point where the handle 6 comes into contact with the stop 5, the antifriction bearing stops, that is to say that its two races remain fixed relative to one another.

The rotation of the movable element of the equipment concerned may however continue beyond this position thanks to the flexibility of the arms 4 situated between the antifriction bearing and the fixed portion of the equipment concerned.

The conventional drive means continues its action to position the movable element of the equipment concerned in the precise direction desired. Doing so, it pushes in rotation the monoblock assembly now consisting of the part 11, the handle 6, the stop 5 and the antifriction bearing and deforms the flexible arms 4 until the desired direction is reached.

The stop 5 having been correctly positioned for this purpose, the part 11 can rotate, while remaining in the zone Z that corresponds to the fluctuations to be covered in the desired direction, without the antifriction bearing itself being made to rotate.

In this way, the invention makes it possible to make the large amplitude movements that are relatively few in number during the deployment phases by actuating the ball or roller antifriction bearing and the many small amplitude movements demanded during the fine error sensing phase by the deformation of the flexible arms.

Because all the small movements are made without using the antifriction bearing, the latter is little used and consumes only a limited number of operating cycles of its service life. This service life is then compatible with that of a satellite, even though the lubrication conditions are not optimal.

On the other hand, the small movements are made without using parts coming into contact with one another, which therefore do not require lubrication. The service life of the fine error sensing device, measured in number of operating cycles, is then relatively long.

The invention has been described by choosing in the figures a particular direction for the rotation of the handle from the position A to the position B. This choice is not an essential feature of the invention, the device being able to operate in both directions.

Similarly, the device has been described with flexible arms 4 positioned on the outside of the antifriction bearing and with the arms 6 supported by the hub 2 of the antifriction bearing. The invention may also be achieved with flexible arms 4 positioned inside the antifriction bearing, between its inner race and a fixed part; the arm is then supported by the outer circular ring, that in this case can be moved.

Although the invention has been described in relation to several particular embodiments, it is evident that it is in no way limited thereto and that it includes all the technical equivalents of the means described and their combinations if the latter came within the context of the invention.

The invention claimed is:

1. A rotary positioning device for a movable portion of space equipment, comprising:

a fixed part attached to a fixed portion of the space equipment;

an antifriction bearing having a first race and a second race;

an elastic link connecting the second race and the fixed part, while permitting rotational movement, about an axis of the antifriction bearing, of the second race relative to the fixed part;

a stop attached to one of the first race or the second race for interacting with the other one of the first race or the second race and angularly limiting a relative rotation of the first race and the second race; and a handle arranged for actuating the movable portion of the space equipment, said handle being rigidly connected to the first race.

2. The rotary positioning device as claimed in claim 1, wherein the stop has an angular position on the race to which the stop is attached, and the angular position is adjustable.

3. The rotary positioning device as claimed in claim 1, further comprising an element attached to the other one of the first race or second race and configured to interact with the stop, wherein the elastic link is at rest when the element configured to interact with the stop is not in contact with said stop.

4. The rotary positioning device as claimed in claim 1, wherein the fixed part has a substantially circular ring shape coaxial with said antifriction bearing.

5. The rotary positioning device as claimed in claim 4, wherein the elastic link comprises a plurality of arms made of flexible material placed radially between the fixed part and the second race.

6. The rotary positioning device as claimed in claim 1, wherein said handle is attached to a hub of the first race.

7. The rotary positioning device as claimed in claim 6, wherein the handle is configured to interact with the stop for angularly limiting the relative rotation of the first race and the second race.

8. A guidance system for space equipment comprising a positioning device as claimed in claim 1.

9. Space equipment comprising a guidance system as claimed in claim 8.

* * * * *